(12) United States Patent
Wuidart (10) Patent No.: US 7,107,008 B2
(45) Date of Patent: *Sep. 12, 2006

(54) VALIDATION OF THE PRESENCE OF AN ELECTROMAGNETIC TRANSPONDER IN THE FIELD OF A PHASE DEMODULATION READER

(75) Inventor: Luc Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 739 days.

This patent is subject to a terminal disclaimer.

(21) Appl. No.: 09/853,262

(22) Filed: May 11, 2001

(65) Prior Publication Data

US 2002/0008612 A1    Jan. 24, 2002

(30) Foreign Application Priority Data

May 12, 2000    (FR)    ................... 00 06064

(51) Int. Cl.
*H04B 17/00*    (2006.01)

(52) U.S. Cl. .................. 455/41.1; 455/226.1; 455/227; 340/10.1; 340/10.4

(58) Field of Classification Search ........... 455/41.2–2, 455/226.1–3, 227–230, 257–264, 41.1, 558; 340/10.1–4, 505, 10.2, 10.3, 10.4
See application file for complete search history.

(56) References Cited

U.S. PATENT DOCUMENTS

| | | | |
|---|---|---|---|
| 4,258,348 A | 3/1981 | Belfer et al. | |
| 4,375,289 A | 3/1983 | Schmall et al. | |
| 4,673,932 A | 6/1987 | Ekchian et al. | |
| 5,084,699 A | 1/1992 | DeMichele | |
| 5,235,326 A | 8/1993 | Beigel et al. | |
| 5,451,958 A | 9/1995 | Schuermann | |
| 5,519,381 A | 5/1996 | Marsh et al. | |
| 5,703,573 A * | 12/1997 | Fujimoto et al. | 340/10.3 |
| 6,028,503 A | 2/2000 | Preishuberpflügl et al. | |
| 6,070,803 A | 6/2000 | Stobbe | |
| 6,150,986 A | 11/2000 | Sandberg et al. | |
| 6,154,635 A * | 11/2000 | Ohta | 455/41.1 |
| 6,304,169 B1 | 10/2001 | Blama et al. | |
| 6,307,468 B1 * | 10/2001 | Ward, Jr. | 340/505 |
| 6,335,665 B1 | 1/2002 | Mendelsohn | |
| 6,356,738 B1 | 3/2002 | Schneider et al. | |
| 6,498,923 B1 * | 12/2002 | Ikefuji et al. | 455/41.1 |
| 6,617,962 B1 | 9/2003 | Horwitz et al. | |
| 6,646,543 B1 | 11/2003 | Mardinian et al. | |
| 6,650,226 B1 * | 11/2003 | Wuidart et al. | 340/10.1 |
| 6,650,227 B1 * | 11/2003 | Bradin | 340/10.3 |

(Continued)

FOREIGN PATENT DOCUMENTS

EP    0 857 981 A1    8/1998

(Continued)

*Primary Examiner*—Nick Corsaro
*Assistant Examiner*—Tuan Tran
(74) *Attorney, Agent, or Firm*—Lisa K. Jorgenson; James H. Morris; Wolf, Greenfield & Sacks, P.C.

(57) ABSTRACT

A terminal for generating an electromagnetic field adapted to communicating with at least one transponder, and a method for controlling such a terminal including: an oscillating circuit adapted to being excited by a remote supply signal of the transponder; a phase demodulator for detecting possible data transmitted by the transponder; circuitry for regulating the signal phase in the terminal's oscillating circuit on a reference value; circuitry for measuring variables linked to the current in the oscillating circuit and to the voltage thereacross; and circuitry for comparing current values of these variables with predetermined values, to determine the presence of a transponder.

14 Claims, 5 Drawing Sheets

U.S. PATENT DOCUMENTS

| | | | |
|---|---|---|---|
| 6,650,229 B1 * | 11/2003 | Wuidart et al. | 340/10.4 |
| 6,703,921 B1 * | 3/2004 | Wuidart et al. | 340/10.4 |
| 2002/0008611 A1 * | 1/2002 | Wuidart | 340/10.1 |
| 2002/0011922 A1 * | 1/2002 | Wuidart | 340/10.4 |
| 2003/0227323 A1 | 12/2003 | Enguent | |

FOREIGN PATENT DOCUMENTS

| WO | WO 9943096 | 8/1999 |
|---|---|---|

* cited by examiner

VALIDATION OF THE PRESENCE OF AN ELECTROMAGNETIC TRANSPONDER IN THE FIELD OF A PHASE DEMODULATION READER

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. Generally, transponders extract the power supply required by the electronic circuits included therein from the high frequency field radiated by an antenna of the read and write terminal.

2. Discussion of the Related Art

Figure 1:
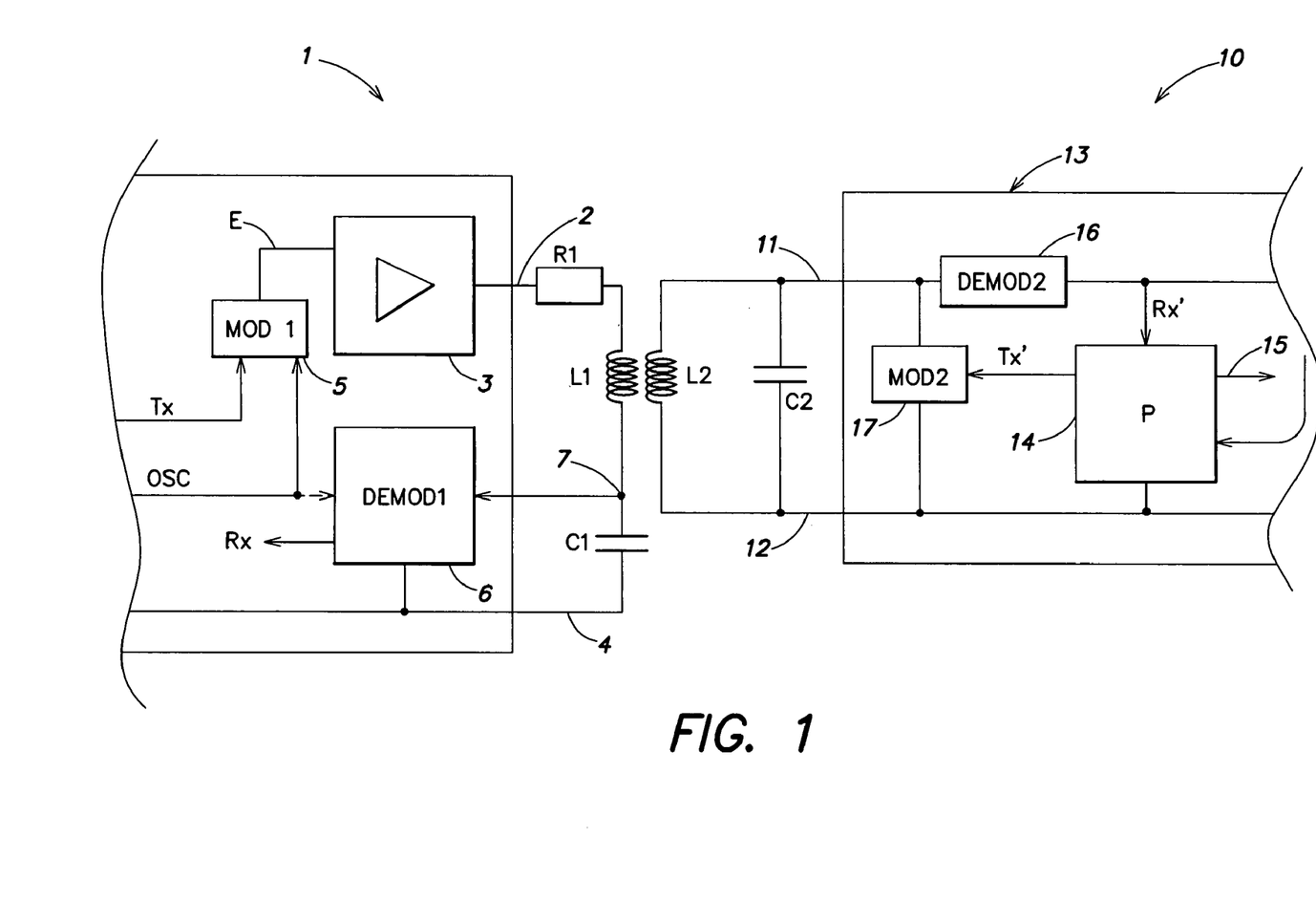
FIG. 1 very schematically shows a conventional example of an electromagnetic transponder system.

FIG. 1 very schematically shows a conventional example of a data exchange system of the type to which the present invention relates between a read/write terminal 1 and a transponder 10.

Generally, terminal 1 is essentially formed of a series oscillating circuit formed of an inductance L1 in series with a capacitor C1 and a resistor R1, between an output terminal 2 of an amplifier or antenna coupler 3 and a terminal 4 at a reference potential (generally, the ground). Amplifier 3 receives a high-frequency transmission signal E, provided by a modulator 5 (MOD1), which receives a reference frequency (signal OSC), for example, from a quartz oscillator (not shown). Modulator 5 receives, if necessary, a data signal Tx to be transmitted and, in the absence of a data transmission from the terminal, provides the high-frequency carrier (for example, at 13.56 MHz) adapted to remotely supply a transponder. In receive mode, terminal 1 uses a demodulator 6 (DEMOD1), which is used to detect a load variation generated by transponder 10 on the high-frequency signal. Demodulator 6 samples, for example, the voltage across terminals 7 and 4 of capacitor C1, and provides a signal Rx of data received after demodulation.

Other circuits, not shown, generally complete a terminal 1. Among these circuits, a circuit for controlling and exploiting the received data most often based on a microprocessor for processing the control signals and the data, may be included, among others. These circuits generally communicate with different input/output circuits (keyboard, screen, means of transmission to a server, etc.) and/or processing circuits, not shown. The circuits of the read/write terminal draw the power required by their operation from a supply circuit (not shown) connected, for example, to the electric supply system or to batteries.

A transponder 10, intended for cooperating with a terminal 1, essentially includes a parallel oscillating circuit formed of an inductance L2, in parallel with a capacitor C2 between two input terminals 11, 12 of a control and processing circuit 13. Terminals 11, 12 are in practice connected to the input of a rectifying means (not shown), outputs of which form D.C. supply terminals of the circuits internal to the transponder. These circuits generally include, essentially, a microprocessor 14 (P) capable of communicating with other elements (for example, a memory) through connections 15. Transponder 10 further includes a demodulator 16 (DEMOD2) of the signals received from terminal 1, which provides a signal Rx' to circuit 14, and a modulator 17 (MOD2) for transmitting to the terminal data Tx' that it receives from circuit 14.

The oscillating circuits of the terminal and of the transponder are generally tuned on a same frequency corresponding to the frequency of an excitation signal of the terminal's oscillating circuit. This high-frequency signal (for example, at 13.56 MHz) is not only used as a transmission carrier but also as a remote supply carrier for the transponder(s) located in the terminal's field. When a transponder 10 is located in the field of a terminal 1, a high-frequency voltage is generated across terminals 11 and 12 of its resonant circuit. This voltage, after being rectified and possibly clipped, is intended for providing the supply voltage of electronic circuits 13 of the transponder. For clarity, the rectifying, clipping, and supply means have not been shown in FIG. 1. It should be noted that, generally, the demodulation (block 16) is performed upstream of the clipping means to keep the amplitude modulation of the data on the high-frequency carrier transmitted by the terminal. This amplitude modulation is performed according to different coding techniques to transmit data and/or control signals to the transponders. In return, data transmission Tx' from the transponder to a terminal is generally performed by modulating the load formed by resonant circuit L2, C2. This is why modulator 17 has been shown in parallel with this resonant circuit. The load variation is performed at the rate of a so-called back-modulation sub-carrier, of a frequency (for example, 847.5 kHz) smaller than that of the carrier.

The load variation coming from a transponder can then be detected by the terminal in the form of an amplitude variation or of a phase variation by means, for example, of a measurement of the voltage across capacitor C1 or of the current in the oscillating circuit by means of demodulator 6.

The present invention more specifically applies to systems having a read and/or write terminal using a phase demodulation to detect the load variation of a transponder in its field and thus demodulate the transmitted data.

A problem that is posed in conventional electromagnetic transponder systems is that a transponder remotely supplied by a terminal and transmitting data to said terminal may be undetected by the terminal, that is, the terminal's demodulator cannot manage to detect the presence of a data modulation. This phenomenon is generally called a "demodulation gap". For a given system, this corresponds to a relative position of a terminal and of a transponder to which the terminal's demodulator is "blind".

It should be noted that this notion of a demodulation gap is different from what is called a "remote supply gap" where the transponder cannot manage to be supplied by the high-frequency signal, even though it is in the terminal's electromagnetic field. Indeed, there exists a relative position between a transponder and a terminal at which the magnetic coupling between oscillating circuits is such that the transponder is not supplied, that is, the voltage recovered across terminals 11 and 12 of its oscillating circuit is too small for it to operate. In a demodulation gap, the transponder is properly supplied. It generally properly detects the data transmitted by the terminal in amplitude modulation. It properly transmits data to the terminal in back-modulation, by variation of the load of its oscillating circuit. However, the terminal's demodulator does not detect this back-modulation.

As a result of this demodulation gap problem, a terminal cannot detect a transponder present in its field since this detection conventionally uses the result of the data demodulator on the terminal side. In particular, when it is in a stand-by state, waiting for a transmission, the terminal periodically transmits interrogation requests by modulating the amplitude of the remote supply carrier. The terminal then monitors the output of its demodulator, which will indicate thereto the presence of a transponder. Indeed, where a transponder is "woken up" by its entering the field of a terminal, it demodulates the interrogation message periodically transmitted by this terminal and answers it to have itself identified.

An additional disadvantage is that, since the transponder has received data from the terminal, it believes that it is identified by the terminal, which is not true. The only present techniques to isolate this phenomenon are to multiply the information exchanges to validate the transmission, which is costly in terms of transmission duration.

Different transponder systems of the type to which the present invention applies are described, for example, in U.S. Pat. Nos. 4,963,887 and 5,550,536, as well as in European patent applications no. 0,722,094 and 0,857,981, all of which are incorporated herein by reference.

In a read/write terminal provided with a phase demodulator, the output voltage of the demodulator annuls, that is, there is a demodulation gap, in a frequency configuration which, for a given coupling coefficient between the oscillating circuits of the terminal and of the involved transponder, corresponds to the perfect tuning of the terminal and of the transponder on the remote supply carrier frequency. On the transponder side, this frequency then is the self-resonant frequency of oscillating circuit L2-C2 of the transponder.

It has already been provided to permanently detune the oscillating circuits of the terminal and of the transponder so that the two circuits are not both tuned on the remote supply carrier frequency. However, a disadvantage that results therefrom is that this adversely affects the transponder remote supply, and thus the system range. Indeed, the power recovered by the transponder is maximum when both oscillating circuits of the terminal and of the transponder are tuned on the carrier frequency.

Further, the manufacturing tolerances of capacitors used for oscillating circuits, in particular for capacitor C2 of the transponder which is generally integrated, generally are on the order of 10%. The extent of these tolerances leads to having to substantially shift from the carrier frequency if it is desired to decrease risks of demodulation gaps.

Thus, a significant disadvantage of conventional phase demodulation systems is that a compromise must be made between the remote supply and the capacity of phase demodulation by the terminal. Further, this compromise is difficult to achieve, since the position of the gap in the phase demodulator response varies according to the mutual inductance between these oscillating circuits. Now, this mutual inductance depends on the distance separating antennas L1 and L2 of the terminal and of the transponder, and thus on the relative position of the transponder with respect to the terminal upon transmission.

The combined problems of the existence of demodulation gaps and of the variation of the position of these demodulation gaps with respect to the distance between the inductances, associated with the manufacturing tolerances of the components, make conventional systems rather unreliable.

SUMMARY OF THE INVENTION

The present invention aims at overcoming the disadvantages of conventional systems relative to the presence of demodulation gaps in the response of the demodulator of a read/write terminal.

More specifically, the present invention aims at providing a novel control method that makes a read/write terminal insensitive to demodulation gaps of the data that it receives from a transponder having entered its field.

The present invention also aims at providing a novel terminal insensitive to demodulation gaps of the data that it receives from a transponder having entered its field.

The present invention also aims at providing a solution which requires no modification of the transponders and which is accordingly compatible with existing transponders.

The present invention further aims at providing a solution that is particularly well adapted to a terminal equipped with a phase demodulator.

To achieve these and other objects, the present invention provides a terminal for generating an electromagnetic field adapted to communicating with at least one transponder entering this field, including: an oscillating circuit adapted to being excited by a high-frequency remote supply signal of the transponder; a phase demodulator for detecting possible data transmitted by the transponder by modulating, at the rate of a sub-carrier, the load that it forms on the terminal's oscillating circuit; means for regulating the signal phase in the terminal's oscillating circuit in response to a reference value having a long response time as compared to said sub-carrier; means for measuring variables linked to the current in the oscillating circuit and to the voltage thereacross; and means for comparing current values of these variables with predetermined values.

According to an embodiment of the present invention, the terminal further includes means for deactivating said phase regulation means, and means for forcing the value of a settable element of the oscillating circuit.

According to an embodiment of the present invention, said settable element is formed of a variable capacitive element of the terminal's oscillating circuit.

According to an embodiment of the present invention, the settable element is common to the phase regulation means and to the forcing means.

The present invention also provides a method for controlling a terminal, including exploiting the results of the comparison means to detect the presence of a transponder in the terminal's field.

According to an embodiment of the present invention, said predetermined values correspond to values measured and stored during an off-load operation of the terminal, while no transponder is present in its field.

According to an embodiment of the present invention, the method includes, in the absence of a useful signal of sufficient amplitude to enable detection of data by the demodulator and if a transponder has been detected by the comparison of the current and predetermined values, deactivating the phase regulation means and forcing the value of the settable element of the oscillating circuit to a value adapted to modifying the impedance of the terminal's oscillating circuit while keeping the transponder's remote supply.

According to an embodiment of the present invention, the forcing value is selected to avoid for said variables to recover said predetermined values.

According to an embodiment of the present invention, the method includes, to select the forcing value:

calculating the present imaginary part of the impedance of the terminal's oscillating circuit; and comparing the current module of this imaginary part with a predetermined limiting value for:

a) if the current module is greater than the limiting value, choosing a forcing value giving to the impedance of the oscillating circuit an imaginary part of same module but of opposite sign with respect to the present imaginary part, or b) if the current module is smaller than or equal to the limiting value, choosing a different forcing value according to whether the present imaginary part is positive or negative.

According to an embodiment of the present invention, the method includes, in case b, of selecting a forcing value depending on the off-load value of the setting element with a proportionality coefficient which:

a') if the present imaginary part is negative, is greater than one; and b') if the present imaginary part is positive, is smaller than one.

According to an embodiment of the present invention, the method includes selecting a forcing value $C1_f$ which:

a') if the present imaginary part is negative, respects the following relation:

$$C1_f = \frac{C1_{off-load}}{1-k_{max}};$$

and b') if the present imaginary part is positive, respects the following relation:

$$C1_f = \frac{C1_{off-load}}{1-k_{max}},$$

where $C1_{off-load}$ represents the off-load capacitance of the setting element and where $k_{max}$ represents the maximum coupling coefficient between the transponder and the terminal.

The foregoing objects, features and advantages of the present invention, will be discussed in detail in the following non-limiting description of specific embodiments in connection with the accompanying drawings.

DETAILED DESCRIPTION

The same elements have been referred to with the same references in the different drawings. For clarity, only those elements of a terminal and of a transponder and only those steps of the information exchange process which are necessary to the understanding of the present invention have been illustrated in the drawings and will be described hereafter. In particular, the details constitutive of the modulators and demodulators have not been detailed and are within the abilities of those skilled in the art based on the functional indications given hereafter. Further, the present invention will be discussed in relation with transponders using a so-called "resistive" back-modulation to vary the load that they form on the terminal's oscillating circuit (the capacitances of the oscillating circuits of the transponders being fixed), but it should be noted that the present invention more generally applies to any type of back-modulation, for example to a so-called "capacitive" back-modulation.

A feature of the present invention is to provide a direct determination of the presence of a transponder in the field of a read/write terminal, that is, without it being necessary to interpret demodulated data transmission signals coming from the transponder. More specifically, the present invention provides, in case of an absence of a demodulated signal usable by the terminal, validating the absence of a transponder in the field thereof by another determination independent from the existence of a data transmission.

Another feature of the present invention is to provide, in case of an incoherence between the result of the demodulator and of the direct determination, a corrective action enabling the terminal's demodulator to correctly interpret the received data. This corrective action is preferentially performed on the terminal's oscillating circuit and, preferably, on the capacitive element of this circuit.

The determination of the presence or the absence of a transponder in the terminal's field is performed, according to the present invention, by a measurement of the current in the terminal's oscillating circuit and of the voltage across its capacitive element (or of variables directly linked to the current and to the voltage), and by comparing the obtained current values with previously-stored values. The latter preferably correspond to values measured in a learning phase where the reader is in a specific configuration.

Figure 2:
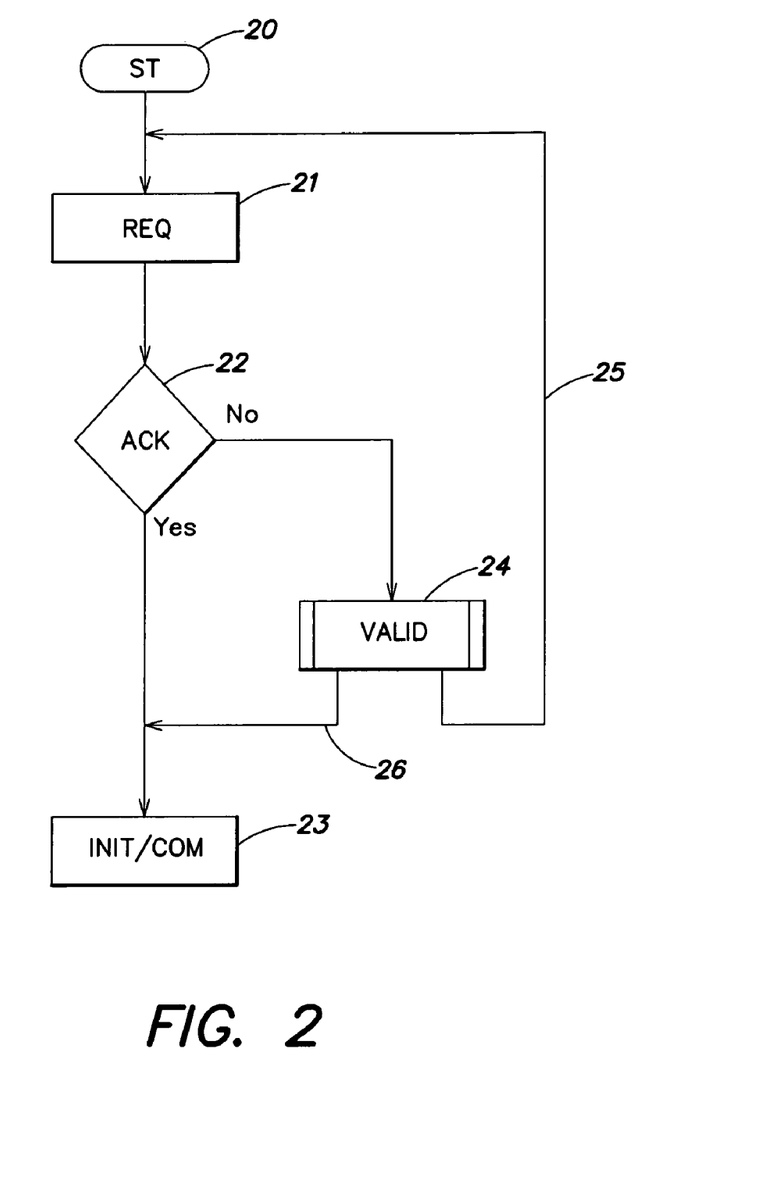
FIG. 2 shows, in the form of a simplified flowchart, an embodiment of the method for validating the presence of a transponder according to the present invention.

FIG. 2 is a simplified flowchart of a mode of implementation of a sequence of validation of the presence of a transponder in the terminal's field, applied to the stand-by state of a read/write terminal.

As soon as it is powered on and in operation, a transponder read/write terminal begins (block 20, ST), after a starting, set and test phase, a stand-by procedure during which it waits for a communication with a transponder to be established. This procedure includes sending (block 21) a request sequence (REQ) to the possible transponder(s) present in the terminal's field. After each sending of an interrogation request 21, the reader monitors (block 22) the reception, by its demodulator, of an acknowledgement message (ACK) coming from a transponder having entered its field.

In a conventional method (not shown), in the absence of an acknowledgement, the reader loops on the sending of a request 21. When its receives an acknowledgement ACK, it switches to a mode of checking whether the transponder really is a transponder intended therefor, as well as to a possible anti-collision mode (block 23, INIT/COM) to individualize several transponders that may be present in the field. Indeed, as a response to an interrogation request by a terminal, if several transponders are present in the field thereof, they may respond at the same time or with a sufficiently low time interval to make the result of the demodulation by the reader unexploitable. Said reader must then either select a transponder with which it wishes to communicate, or assign different channels to the different transponders.

A communication only starts when the initialization and anti-collision process illustrated in FIG. 2 by block 23 is over. As soon as a given transponder has been properly identified, it is placed in a state where it no longer acknowledges interrogation requests to avoid polluting the detection of the other possible transponders.

An initialization and anti-collision process of the type briefly described hereabove is known. Illustrations of conventional methods are for example to be found in French patent applications no. 2,760,280 and 2,773,627, which are hereby incorporated by reference.

Be it during stand-by procedures or during a communication, the terminal exploits the results provided by its demodulator.

According to the present invention, each time the reader expects to obtain a result from its demodulator and this result is negative (block 22), a validation procedure of the present invention (block 24, VALID) is implemented.

If the implementation of the method of the present invention validates the absence of a transponder in the terminal's field, the conventional sending of an interrogation request (link 25) is resumed. However, if the checking performed by the present invention invalidates the demodulator result and indicates that a transponder must be present in the terminal's field, a corrective action is performed on its oscillating circuit before carrying on the communication initialization (link 26).

To get rid of the problem of tolerance and drift of the transponders' oscillating circuit components, the values of these elements being further likely to vary from one transponder to another, it is provided according to the present invention to regulate the phase of the terminal's oscillating circuit with respect to a reference value. According to the present invention, this phase regulation is performed by means of a loop having a response time chosen so that the loop is sufficiently slow to avoid disturbing the possible back-modulation from the transponder and sufficiently fast as compared to the passing speed of a transponder in the terminal's field. This can be called a static regulation with respect to the modulation frequencies (for example, the 13.56-MHz remote supply carrier frequency and the 847.5-kHz back-modulation frequency used in the data transmission from the transponder to the terminal).

Such a phase control of the terminal's oscillating circuit can be implemented by using known means such as those described, for example, in above-mentioned European patent application no. 0,857,981. The adaptation of the system provided by this document to implement the present invention, or of another known phase control system, is within the abilities of those skilled in the art based on the functional indications given in the present description.

Due to the use of a phase regulation loop, current and voltage measurements in the terminal's oscillating circuit can now be exploited to deduce therefrom, according to the present invention, an information relative to the presence of one or several transponders in the field.

The current, designated by I, in the terminal's series oscillating circuit (for example, measured by a current transformer) is linked to the so-called generator voltage (Vg), exciting the oscillating circuit and to the apparent impedance $Z1_{app}$ of the oscillating circuit by the following relation:

$$Z1_{app} = \frac{Vg}{I} \quad (1)$$

Now, considering that the series inductance and resistance of the terminal's oscillating circuit have fixed and immutable values, at least for a given terminal, the excitation voltage of the oscillating circuit is proportional by a constant coefficient to the voltage (VC1) across the capacitive element of the terminal. Accordingly, evaluating the apparent impedance of the terminal's oscillating circuit amounts to evaluating the ratio between the voltage across the capacitive element and the current in the oscillating circuit.

The evaluation of the presence of a transponder performed by the present invention exclusively uses the current information in the terminal's oscillating circuit and the voltage information thereacross, more specifically across its capacitive element (or information directly linked, by invariable and determined coefficients, to these variables).

According to the present invention, the so-called "off-load" values of the current and of the voltage are used when no transponder is present in the terminal's field. These electric magnitudes are easily measurable on the read/write terminal side, for example, in a learning phase, for example following the implantation of the terminal in its application site.

Afterwards, by evaluating the current ratio (or a linked information) between the voltage across the capacitive element and the current in the oscillating circuit, the presence of a transponder in the field can be deduced.

Figure 3:
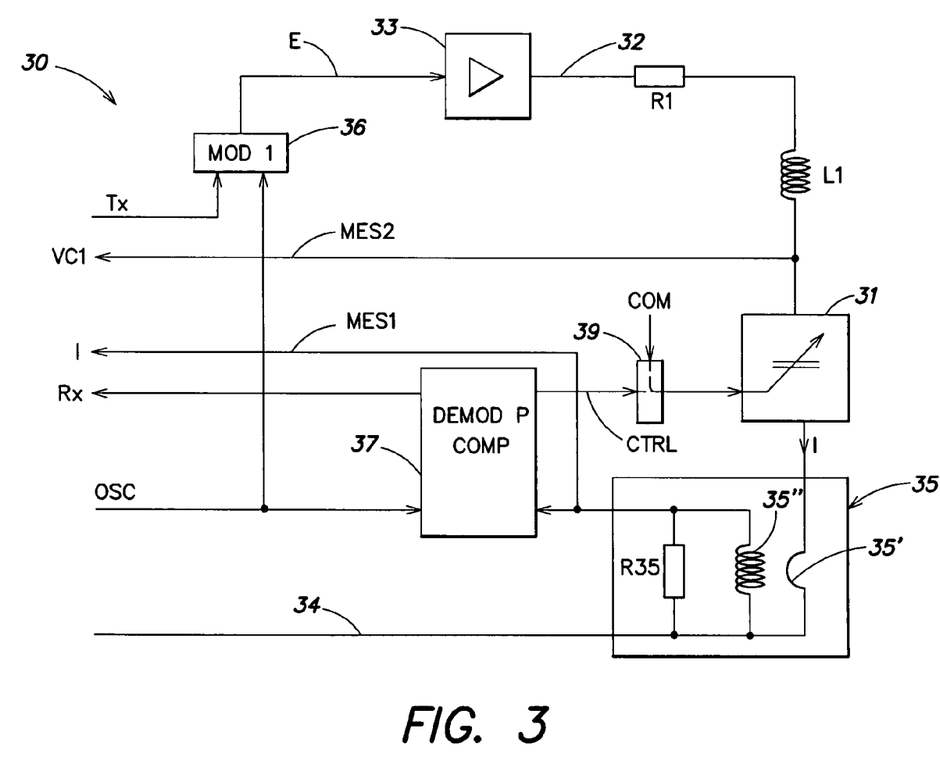
FIG. 3 partially and schematically shows an embodiment of a phase demodulation read/write terminal according to the present invention.

FIG. 3 schematically shows, in a simplified manner, an embodiment of a read/write terminal according to the present invention, equipped with a phase regulation loop of the oscillating circuit and with a phase demodulator.

Conventionally, terminal 30 includes an oscillating circuit formed of an inductance or antenna L1, in series with a capacitive element 31 and a resistive element R1, between an output terminal 32 of an amplifier or antenna coupler 33 and a terminal 34 at a reference potential (generally, the ground). An element 35 for measuring the current in the oscillating circuit is interposed, for example, between capacitive element 31 and ground 34. Measurement element 35 is especially used to provide the information about the current (I) intended for the data exploitation means on the terminal side formed, for example, of a microprocessor (not shown). Amplifier 33 receives a high-frequency transmission signal E, coming from a modulator 36 (MOD1) which receives a reference frequency (signal OSC), for example, from a quartz oscillator (not shown). Modulator 36 receives, if necessary, a signal Tx of data to be transmitted and, in the absence of any data transmission from the terminal, provides the high-frequency carrier (for example at 13.56 MHz) adapted to remotely supplying a transponder. Capacitive element 31 is a variable-capacitance element controllable by a signal CTRL.

A phase regulation of the current in antenna L1 is performed with respect to a reference signal. This regulation is a regulation of the high-frequency signal, that is, of the carrier signal corresponding to signal E in the absence of data to be transmitted. This regulation is performed by varying the capacitance of the oscillating circuit of terminal 30 to maintain the current in the antenna in a constant phase relation with the reference signal which corresponds, for example, to signal OSC provided by the modulator's oscillator. However, the regulation is sufficiently slow to only take into account the static phase variations with respect to the back-modulation carrier. Signal CTRL originates from a circuit 37 (COMP) having the function of detecting the phase interval with respect to the reference signal and accordingly modifying the capacitance of element 31. In the present example, the phase measurement is performed from a measurement of current I in the circuit by means of current transformer 35 connected in series with element 31. This transformer generally is formed of a primary winding 35' between element 31 and the ground, and of a secondary winding 35", a first terminal of which is directly connected to ground 34 and a second terminal of which provides a signal MES1 depending on current I, sent to comparator 37 which accordingly controls capacitive element 31 by means of signal CTRL.

According to the present invention, signal MES1 is also sent, as previously indicated, to the microprocessor or the like to implement the validation method of the present invention. A second measurement signal MES2, providing an information relative to voltage VC1 across capacitive element 31, is also sent to the microprocessor. This signal is sampled, for example, between inductance L1 and element 31.

Terminal 30 further includes a phase demodulator (DEMODP) adapted to providing a signal Rx giving back a possible back-modulation of data received from a transponder to the rest of the terminal's electronic circuits, not shown. According to a preferred embodiment illustrated in FIG. 3, comparator 37 of the phase regulation loop uses the same phase demodulator as that which is used to demodulate the signal from the transponder. Accordingly, signal Rx of data demodulated based on an evaluation of the phase shift is provided by comparator 37. It should however be reminded that the interpretation of the detection result is different. The demodulator takes account of the dynamic variations (at the sub-carrier frequency) while the phase regulator takes account of the static variations. As an alternative, two separate phase demodulators may of course be used.

Figure 4:
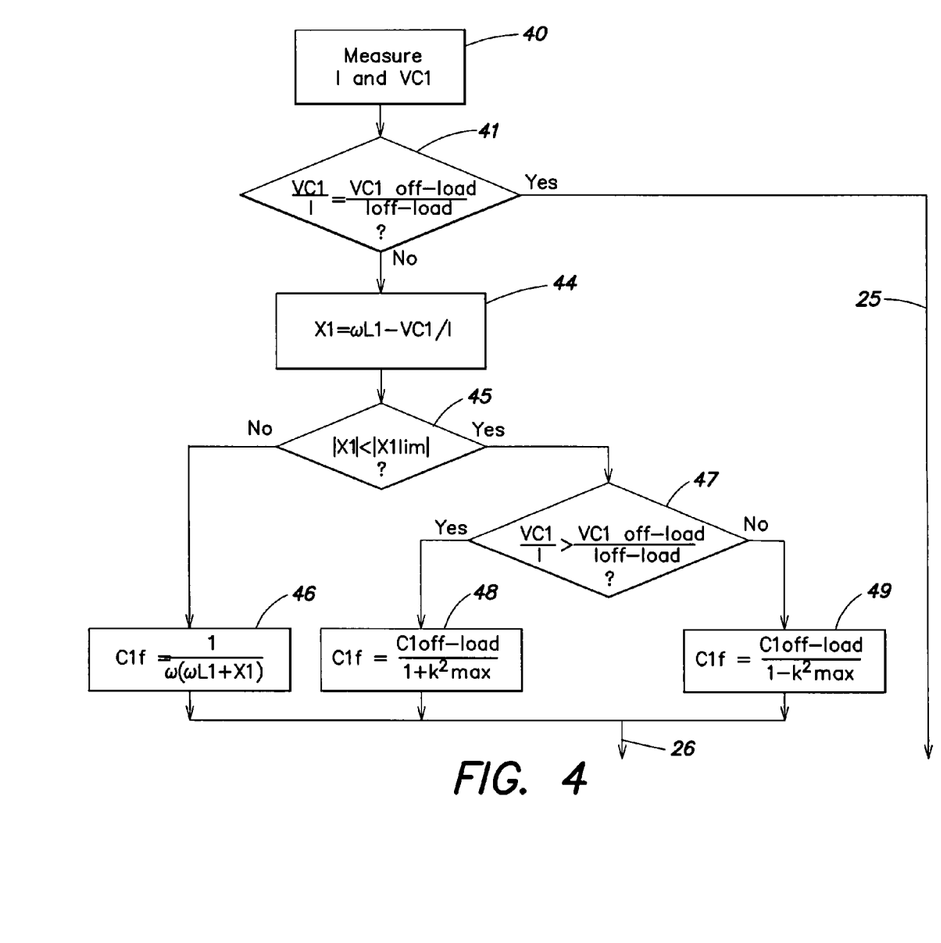
FIG. 4 illustrates, in the form of a flowchart, a mode of implementation of the validation method of the present invention.

FIG. 4 is a flowchart of an embodiment of the validation method (block 24, FIG. 2) of the present invention.

As previously indicated, current I and voltage VC1 are first measured (block 40) in the oscillating circuit. Then, the ratio of voltage VC1 on current I is compared (block 41) to the same values, measured off-load ($VC1_{off\text{-}load}$ and $I_{off\text{-}load}$) in a learning phase. If the two ratios are identical, this means that no transponder is present in the terminal's field and the validation process provides this information (link 25). However, if the two ratios are different, this means that the demodulator is in a demodulation gap even though a transponder is present in the terminal's field.

Indeed, imaginary part $X1_{app}$ of apparent impedance $Z1_{app}$ of the terminal's oscillating circuit can be expressed as:

$$X1_{app} = X1 - a2.X2, \quad (2)$$

where X1 represents the imaginary part of the impedance of the terminal's oscillating circuit, that is:

$$X1 = L1 \cdot \omega - \frac{1}{C1 \cdot \omega}, \quad (3)$$

where X2 represents the imaginary part of the transponder's oscillating circuit, that is:

$$X2 = L2 \cdot \omega - \frac{1}{C2 \cdot \omega}, \quad (4)$$

and with:

$$a^2 = \frac{k^2 \cdot \omega^2 \cdot L1 \cdot L2}{X2^2 + R2^2}, \quad (5)$$

where ω represents the pulse and where R2 represents the load formed by the transponder's oscillating circuits on its own oscillating circuit, modeled by a resistor in parallel with inductance L2 and capacitor C2. In other words, resistor R2 represents the equivalent resistance of all the circuits (microprocessors, back-modulation means, etc.) of the transponder, added in parallel on capacitor C2 and inductance L2.

Due to the phase regulation, imaginary part $X1_{app}$ is null. Accordingly:

$$X1 = a^2.X2. \quad (6)$$

Based on these relations, the difference between the current and off-load values can be expressed as follows:

$$X1 - X1_{off\text{-}load} = a^2.X2 - a_{off\text{-}load}^2.X2. \quad (7)$$

Now, coefficient aoff-load is null since the off-load coupling is also null. Further, voltage VC1 across element 31 (neglecting the influence of intensity transformer 35) can be written as I/ωC1. As a result, formula (7) hereabove can be written as:

$$a^2 X2 = \frac{VC1_{off\text{-}load}}{I_{off\text{-}load}} - \frac{VC1}{I}. \quad (8)$$

If above expression 8 is different from zero, this not only means that a transponder is present in the terminal's field, but also that, for this transponder, variable X2 is different from 0, that is, its oscillating circuit is out of tune, even slightly. This is consistent with the fact that the transponder transmits data to the terminal, that is, it modifies the load that it forms on the terminal's oscillating circuit.

In other words, it can be considered that the above formula annuls in two cases only. The first case corresponds to the case where no transponder is present in the terminal's field. The second case is that where capacitor C2 of the transponder's oscillating circuit is perfectly tuned on the remote supply carrier. In this case, X2=0.

In practice, technological dispersions and operating drifts of the transponder result in variations by more or less 10% of the capacitance of capacitor C2 with respect to a tuning value $C2_{tun}$. Further, nothing can generally be done on the transponder to correct these variations. This is in particular why the phase regulation loop improves or optimizes the remote supply of the transponder by compensating for these possible drifts by modifying the tuning on the read/write terminal side.

The correction performed according to the present invention to come out of a demodulation gap includes, preferably, forcing the value of capacitance C1 of element 31 on a predetermined value in the learning phase. This choice is linked to the fact that the phase regulation is preferably performed by modifying the capacitance of the oscillating circuit. Accordingly, a variable capacitive element, the value of which can be adjusted, is provided, either to statically control the phase in the oscillating circuit, or to force the value of the capacitive element to shift the circuit tuning when in the presence of a demodulation gap.

The forcing of the value of capacitance C1 is performed, for example, by means of a signal COM issued by the processor (not shown) to a circuit 39 for selecting the control set point of element 31 between signal CTRL provided by circuit 37 and the forcing value. The practical implementation of this function is within the abilities of those skilled in the art. It may for example be provided that signal COM carrying the predetermined set point of capacitance C1 always holds the priority with respect to signal CTRL carrying the controlled set point, or an additional control signal (not shown) may be provided to select one of the two inputs of circuit 39. As an alternative, the phase regulator may be modified to be able to impose a different set point value to it, enabling the forced value of capacitance C1 to be provided by signal CTRL.

It should be noted that by forcing the value of the capacitance, the phase in the oscillator is then no longer regulated. However, this correction of the present invention only intervenes in very specific cases where the demodulator is "blind". The regulation value of the capacitance is, of course, recovered as soon as this situation disappears, for example, as soon as the communication with the involved transponder ends.

Figure 5:
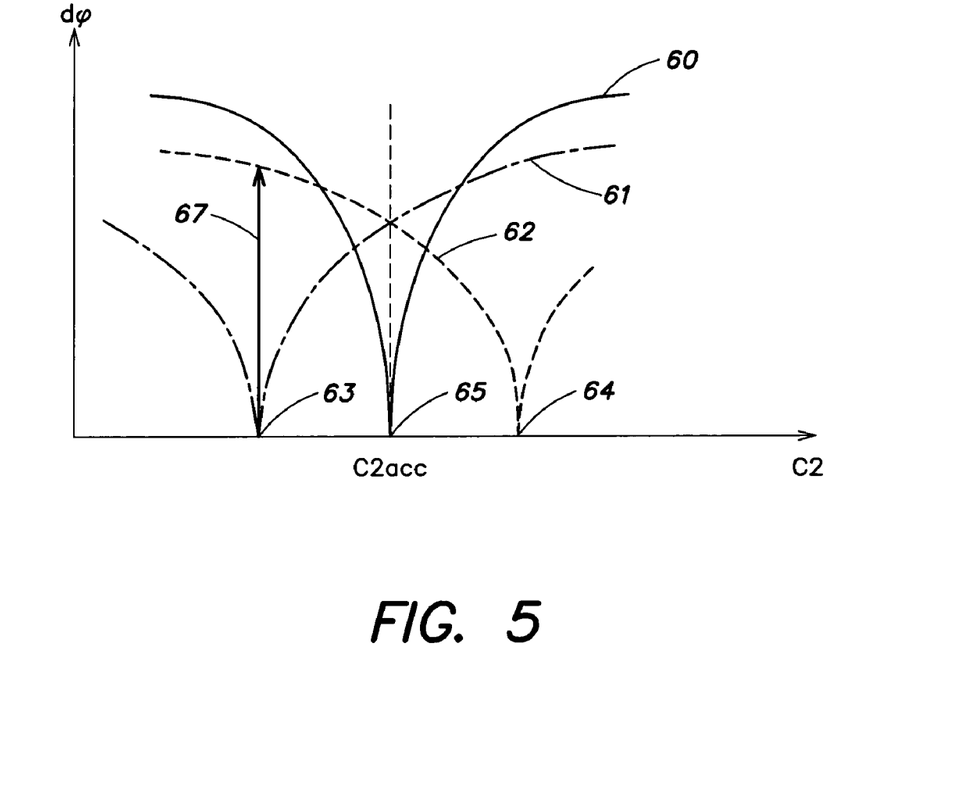
FIG. 5 shows examples of the shape of the amplitude of the phase variation available at the input of the phase demodulator of a read/write terminal according to the capacitance of the oscillating circuit of a transponder having entered the field of this terminal.

FIG. 5 illustrates the implementation of the method of the present invention by showing three examples of variation amplitudes dφ of the phase, available for the phase demodulator according to capacitance C2 of the transponder present in the terminal's field. In other words, this illustrates the signal available to exploit a back-modulation coming from a transponder by means of the phase demodulator. Variation dφ represents the signal to be detected by phase demodulator 37. This is thus a "dynamic" variation (at the rate of the back-modulation remote carrier, for example, 847.5 kHz).

A first curve 60 plotted in full line corresponds to the ideal case where the imaginary part of impedance X1 (formula 3) of the terminal's oscillating circuit is null. This means that the terminal's oscillating circuit is perfectly tuned, including in its dynamic operation. This case is ideal since, given that the reader is provided with a phase loop, which is static with respect to the variations generated by the back-modulation (for example at 847 kHz), apparent value $X1_{app}$ is statically null (formula 2).

Shape 60 grows hyperbolically, symmetrically, on either side of a minimum 65 at value $C2_{tun}$ of the capacitance of a transponder perfectly tuned on the remote supply carrier and which, in phase demodulation, corresponds to a demodulation gap.

With respect to this ideal case, two types of curves, respectively 61 in stripe-dot lines and 62 in dotted lines corresponding to two real cases where the imaginary part of the terminal's oscillating circuit is respectively positive or negative. In each of these curves 61 and 62, points, respectively 63 and 64, are seen to appear in which phase variation dφ is null. These points correspond to demodulation gaps and surround point 65. It should be noted that curves 61 and 62 exhibit, each, a second minimum, on the other side of point 65 with respect to their first respective minima 63 and 64. These second minima are however outside of the tolerance and drift ranges of the transponder components. Accordingly, they are considered to be impossible in practice. In the example shown, symmetrical positions of minima 63 and 64 with respect to minimum 65 have been considered. This shows that curves 61 and 62 intersect for a value of capacitance C2 which corresponds to tuning value $C2_{tun}$.

Three demodulation gaps 63, 64, and 65 are thus likely to be present in the response of the phase demodulation. According to the present invention, since it is not desirable to pass on the ideal curve, the correction to be brought differs according to the demodulation gap that is desired to be avoided. Accordingly, when the testing of block 41 gives a negative response, it must still be determined what demodulation gap is involved. For this purpose, the present invention provides a new analysis of the behavior of the oscillating circuits of a terminal and of a transponder to determine, still based on values calculated in a learning phase and on a comparison with current values, the correction to be performed.

It should be reminded that, to avoid affecting the remote supply of the transponder, the correction must, if possible, introduce no static detuning of the terminal's oscillating circuit. Indeed, the beneficial effect of the phase regulation loop on the transponder's remote supply is desired to be preserved. To maintain the remote supply without intervening on the components of the transponder's oscillating circuit, the amplitude of imaginary part X1 of the impedance of the terminal's oscillating circuit must not be modified by the correction. This amounts to maintaining the module of imaginary part X1.

Based on the illustration of FIG. 5, it is provided according to the present invention to pass onto the symmetrical curve with respect to point 65, that is, onto the curve representing the imaginary part of opposite sign but of same module. This effect is illustrated, in FIG. 5, by an arrow 67 illustrating the coming out of gap 63 of curve 61 by shifting on curve 62.

Based on relation 3 indicated hereabove, this amounts to choosing, for capacitance C1, the following forcing value $C1_f$:

$$C1_f = \frac{1}{\omega \cdot (\omega \cdot L1 + X1)}. \qquad (9)$$

Now, the current value of X1 (before correction) is known, either because this value is available at the level of phase regulation circuit 37, or from the following formula:

$$X1 = \omega \cdot L1 - \frac{VC1}{I}. \qquad (10)$$

In the example of FIG. 4, it is provided to calculate (block 44) imaginary part X1 based on relation 11 hereabove. It should be noted that all the variables necessary to this calculation are known or measurable (block 40, FIG. 4).

However, if minimum 63 is close to minimum 65, the correction provided hereabove is not sufficient since the amplitude of the useful signal will remain insufficient on the symmetrical curve. In this case, the present invention provides forcing a value of X1 of opposite sign and sufficiently large to move away from the "theoretical" or "ideal" tuning gap 65. This amounts to passing onto another curve not only having its minimum separated from the current minimum by point 65, but also having a different value of the apparent impedance. A decrease of the transponder's remote supply must thus here be accepted. It is however attempted to make it a minimal decrease.

It can be shown that the demodulation gap tends towards value $C2_{tun}$ when imaginary part X1 tends towards the following value:

$$X1 = k^2 \cdot \omega \cdot L1, \qquad (11)$$

with k ranging between 0 and $k_{max}$, where $k_{max}$ represents the maximum coupling coefficient between the oscillating circuits of the terminal and of the transponder, that is, the coupling coefficient between these two circuits when their respective antennas L1 and L2 are in a relation of maximum closeness.

Since ω·L1 is an invariant, only the value of k has an influence on that of X1.

Further, since all the adaptations provided by the present invention are intended for being performed in real time and automatically, a forcing value $C1_f$ easily determinable by a calculation based on stored and measured values must be provided. To have a sufficient value of X1, the value of k can be forced to $k_{max}$ to be in the same conditions as those of a transponder at the maximum coupling where it is known to be out of a demodulation gap.

Accordingly, it is provided to predetermine, in the learning phase, a limiting value $X1_{lim}$ of the imaginary part of the impedance of the terminal's oscillating circuit below which the module must not fall. This value is given by the following relation:

$$X1_{lim} = k_{max}2.\omega.L1. \tag{12}$$

Coefficient $k_{max}$ is, approximately but sufficiently, known for a given family of transponders for which the considered terminal is intended. It generally ranges between approximately 0.1 and 0.4.

As illustrated in FIG. 4, after having calculated the present imaginary part X1 of the impedance of the terminal's oscillating circuit, its module is compared (block 45) to the absolute value of limiting value $X1_{lim}$.

If the present absolute value is greater than or equal to the limiting absolute value, it may be proceeded as indicated hereabove and the forcing value of relation 10 hereabove is applied (block 46).

If the present absolute value is smaller than the limiting absolute value, it is attempted to determine on which side of the off-load value it is to be found. The ratios of the measured and off-load voltage VC1 and current I are thus measured (block 47). This amounts to determining whether imaginary part X1 is positive or negative.

If the current ratio is greater than the off-load ratio, the following forcing value is applied (block 48):

$$C1_f = \frac{C1_{off-load}}{1 + k_{max}^2}. \tag{13}$$

If the current ratio is smaller than the off-load ratio, the following forcing value is applied (block 49):

$$C1_f = \frac{C1_{off-load}}{1 - k_{max}^2}. \tag{14}$$

Once the capacitance of element 31 has been forced, the initialization process (FIG. 2) proceeds (link 26) based on this new capacitance value.

By applying the example of generally acknowledged values where $k_{max}$ ranges between 0.1 and 0.4, the application of relations 13 and 14 results in choosing, in the first case, a value $C1_f$ ranging between approximately 0.8 and 0.9 times value $C1_{off-load}$ and, in the second case, a value $C1_f$ ranging between approximately 1.1 and 1.2 times value $C1_{off-load}$.

It should be noted that dynamic phase shift $d\phi$ can be measured, either on current I or on voltage VC1 or the like. Accordingly, the present invention also applies to the case where means other than a current sensor are used to detect the phase shift. This depends on the type of phase demodulator used.

An advantage of the present invention is that by means of a determination of easily measurable electric variables, the reliability of the operation of a read/write terminal of electromagnetic transponders is considerably improved.

Another advantage of the present invention is that the only intervention is performed on the read/write terminal side. Accordingly, the operation of the transponder present in the terminal's field is not modified and the present invention can be implemented with existing conventional transponders.

Another advantage of the present invention is that by choosing to intervene on the setting variable of the static phase regulation loop, structural modifications of the terminal are reduced or minimized.

Another advantage of the present invention is that it makes the operation of the transponder system insensitive to demodulation gaps.

Another advantage of the present invention is that the implemented correction does not adversely affect the transponder remote supply.

Another advantage of the present invention is that it requires no adaptation according to the demodulator sensitivity. It can even be considered that it automatically adapts to a variation of the demodulation gap. Indeed, since the correction performed by the present invention is implemented based on the result of the demodulation, it is independent from the demodulator's detection threshold.

Of course, the present invention is likely to have various alterations, modifications, and improvements which will readily occur to those skilled in the art. In particular, the practical implementation of the validation process of the present invention by means of the conventional components of a read/write terminal is within the abilities of those skilled in the art based on the functional indications given hereabove and on the considered application.

Further, although reference has been made in the foregoing description to the presence of a transponder with which the terminal is to communicate, the present invention also applies to the case where several transponders must communicate with a same terminal. In a simplified way, it can then be provided to force the value of capacitance C1 as soon as one of the transponders has been identified as posing a demodulation gap problem. It is then considered that the attenuation of the useful signal that may result therefrom for the other transponders is bearable. However, in a preferred embodiment, account is taken of the fact that the value forced for a transponder has a risk, even slight, of placing another transponder in a demodulation gap. It is then provided to individualize the values of the capacitances of element 31 of the terminal to the different transponders. This is possible when the communications of several transponders with the same terminal are separated in time channels. Then, either the values of capacitance C1 can be stored upon detection of the transponders and one of these values can be imposed upon each channel switching (and thus transponder switching), or the validation steps (block 24, FIG. 2) can be provided upon each beginning of transmission of a data sequence from a transponder to the terminal. An advantage of this last solution is that it then takes into account the possible motions of a transponder during communication. It should be noted that it is possible to implement this last solution in the case of a single transponder to take account of this last advantage.

Moreover, in the foregoing description, it has been considered that the value of capacitance C2 is fixed, that is, that the back-modulation is performed by varying equivalent resistance R2. However, the present invention transposes to the case of a "capacitive" back-modulation that modifies the value of capacitance C2 at the sub-carrier rate. In this case, the demodulation gaps depend on resistance R2 and thus vary according to the consumption of the transponder circuits. The above-discussed detection principle is not modified. The correction will simply be adapted on the terminal side.

Finally, although the determination based on the voltage across capacitive element 31 is a solution that is particularly simple to implement, account may be taken of an equivalent voltage sampled at other points, provided that it is linked to the voltage across the terminal's oscillating circuit and that it is responsive (dynamically) to the variations caused by the back-modulation of a transponder.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating an electromagnetic field adapted to communicating with at least one transponder entering this field, including:
    an oscillating circuit adapted to being excited by a high-frequency remote supply signal of the transponder;
    a phase demodulator for detecting possible data transmitted by the transponder by modulating, at a rate of a sub-carrier, a load that it forms on the terminal's oscillating circuit;
    and including:
    means for regulating a signal phase in the terminal's oscillating circuit in response to a reference value having a long response time as compared to said sub-carrier;
    means for measuring variables linked to a current in the oscillating circuit and to the voltage thereacross;
    means for comparing present values of these variables with predetermined values; and
    means for deactivating said phase regulation means.

2. The terminal of claim 1, further including:
    means for forcing a value of a settable element of the oscillating circuit.

3. The terminal of claim 2, wherein said settable element is formed of a variable capacitive element of the oscillating circuit of the terminal.

4. The terminal of claim 2, wherein the settable element is common to the phase regulation means and to the forcing means.

5. The terminal of claim 1, further comprising:
    a circuit to determine the presence of a transponder in the terminal's field by exploiting the results of the comparison means.

6. The terminal of claim 5, wherein the circuit comprises a microprocessor.

7. The terminal of claim 1, wherein said predetermined values correspond to values measured and stored during an off-load operation of the terminal, while no transponder is present in the electromagnetic field.

8. A method for controlling a terminal for generating an electromagnetic field adapted to communicating with at least one transponder entering this field, the terminal including an oscillating circuit adapted to being excited by a high-frequency remote supply signal of the transponder, a phase demodulator for detecting possible data transmitted by the transponder by modulating, at a rate of a sub-carrier, a load that it forms on the terminal's oscillating circuit; means for regulating a signal phase in the terminal's oscillating circuit in response to a reference value having a long response time as compared to said sub-carrier, means for measuring variables linked to a current in the oscillating circuit and to the voltage thereacross, and means for comparing present values of these variables with predetermined values, the method including:
    exploiting the results of the comparison means to detect the presence of a transponder in the terminal's field; and
    deactivating the phase regulation means.

9. The method of claim 8, wherein said predetermined values correspond to values measured and stored during an off-load operation of the terminal, while no transponder is present in its field.

10. The method of claim 8, wherein the step of deactivating is performed if there is an absence of a useful signal of sufficient amplitude to enable detection of data by the demodulator and a transponder has been detected by the comparison of the current and predetermined values, the method further including, in the absence of a useful signal of sufficient amplitude to enable detection of data by the demodulator and if a transponder has been detected by the comparison of the current and predetermined values, forcing the value of the settable element of the oscillating circuit to a value adapted to modifying an impedance of the terminal's oscillating circuit while maintaining the transponder's remote supply.

11. The method of claim 10, wherein the forcing value is selected to avoid for said variables to recover said predetermined values.

12. The method of claim 11, including, to select the forcing value, of:
    calculating a present imaginary part of an impedance of the terminal's oscillating circuit;
    comparing a present absolute value of this imaginary part with a predetermined limiting value for:
    a) if the a present absolute value is greater than the limiting value, choosing a forcing value giving to the impedance of the oscillating circuit an imaginary part of a same absolute value but of opposite sign with respect to the present imaginary part, or
    b) if the present absolute value is smaller than or equal to the limiting value, choosing a different forcing value according to whether the present imaginary part is positive or negative.

13. The method of claim 12, including, in case b, selecting a forcing value depending on the off-load value of the setting element with a proportionality coefficient which:
    a') if the present imaginary part is negative, is greater than one; and
    b') if the present imaginary part is positive, is smaller than one.

14. The method of claim 12, including selecting a forcing value $C1_f$ which:
    a') if the present imaginary part is negative, respects the following relation; and
    b') if the present imaginary part is positive, respects the following relation:
    where $C1_{off-load}$ represents the off-load capacitance of the setting element and where $k_{max}$ represents the maximum coupling coefficient between the transponder and the terminal.

* * * * *

UNITED STATES PATENT AND TRADEMARK OFFICE
CERTIFICATE OF CORRECTION

PATENT NO. : 7,107,008 B2
APPLICATION NO. : 09/853262
DATED : September 12, 2006
INVENTOR(S) : Luc Wuidart It is certified that error appears in the above-identified patent and that said Letters Patent is hereby corrected as shown below:

Column 5, lines 15 – 25 should read as shown below:

$$C1_f = \frac{C1_{off-load}}{1-k_{max}^2} \text{ and };$$

b') if the present imaginary part is positive, respects the following relation:

$$C1_f = \frac{C1_{off-load}}{1+k_{max}^2},$$

Signed and Sealed this

Twenty-eighth Day of November, 2006

JON W. DUDAS
*Director of the United States Patent and Trademark Office*